Sept. 10, 1968  E. KARWAT  3,400,546
HYDROGEN PRODUCTION AND ENRICHMENT
Filed June 18, 1965  2 Sheets-Sheet 1

INVENTOR
Ernst Karwat
By
ATTORNEY

INVENTOR
Ernst Karwat

United States Patent Office 3,400,546
Patented Sept. 10, 1968

3,400,546
HYDROGEN PRODUCTION AND ENRICHMENT
Ernst Karwat, Pullach, Isartal, Germany, assignor to Gesellschaft fur Linde's Eismaschinen Aktiengesellschaft, Wiesbaden, Germany
Filed June 18, 1965, Ser. No. 464,965
Claims priority, application Germany, June 18, 1964, G 40,875
9 Claims. (Cl. 62—12)

ABSTRACT OF THE DISCLOSURE

Hydrogen containing feed gas is enriched in hydrogen content without fractional distillation by cooling the feed gas in a first regenerator to remove by solidification the bulk of higher boiling impurities, thus obtaining a gas enriched in hydrogen. A minor portion of the enriched hydrogen is used to sublime impurities from a second regenerator in which impurities were previously deposited while a main portion and another warmed minor portion of enriched hydrogen is work expanded and passed thru a third regenerator which has previously been substantially completely purged of impurities.

---

Figure 1:
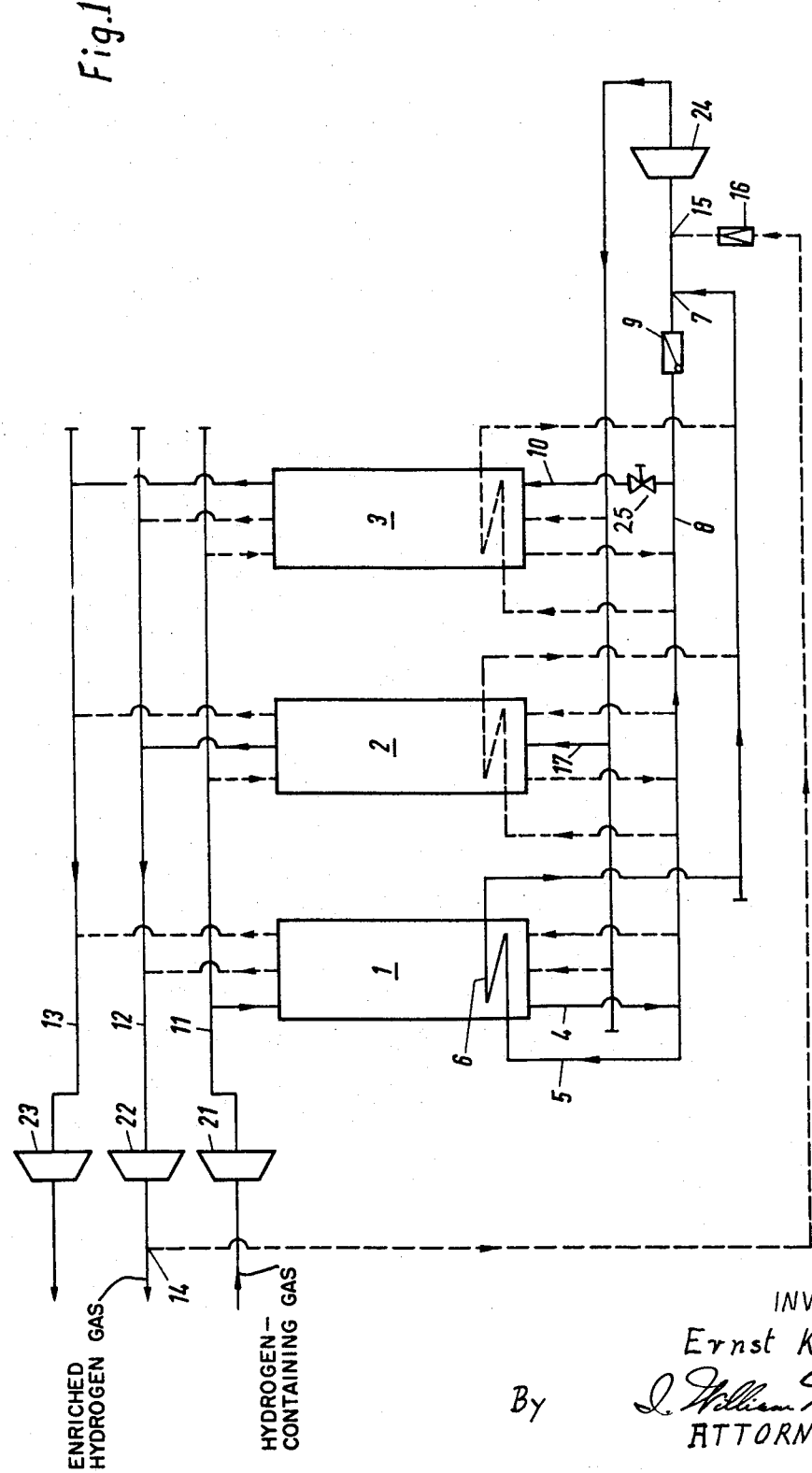

The invention relates to a process and an apparatus for enriching gases, and in particular for enriching the hydrogen content in hydrogen-containing gaseous mixtures in order to obtain low cost hydrogen of higher concentration and especially for the simultaneous enrichment and production of hydrogen in hydrogen-containing gaseous mixtures.

At the present time, there is a large demand for hydrogen of moderate purity, for example, 85 to 97% $H_2$ for use in refinery operations. In addition to the conventional utilization of hydrogen as a desulfurization agent, recently a demand has developed for hydrogen to be used for petrochemical purposes, for improving catalytic cracking and for processing previously rejected raw product stocks and by-products. During the hydrocracking operation, there is a gradual build-up in the hydrogen cycle of gaseous hydrocarbons of 1 to 5 carbon atoms, hydrogen sulfide, organic sulfur compounds, as well as carbon dioxide, CO, and $N_2$. The hydrogen concentration correspondingly decreases from an initial amount of about 95% to, for example, 40 to 60%. In order to prevent the hydrogenation reaction rate from likewise decreasing, the partial pressure of the hydrogen must be maintained constant; thus, the total pressure must be correspondingly increased. For this reason, it is desirable to remove the hydrogenating gas from the process at about a 40% content of hydrogen, and to enrich it to the initial concentration of, for example, 95% $H_2$.

An object of this invention, therefore, is to provide one or more inexpensive processes for enriching the hydrogen content of hydrogen-containing gases.

Another object is to provide a process for enriching a gas in a principal component by condensing undesired components in a low temperature regenerator.

A further object is to provide a process for the simultaneous enrichment and production of hydrogen from gaseous mixtures containing hydrogen and hydrocarbons by partial oxidation of the hydrocarbons and condensing undesired components from the resultant mixture.

Still other objects are to provide novel apparatuses which are useful for, inter alia, conducting the processes of this invention.

Upon further study of the specification and claims, other objects and advantages of the present invention will become apparent.

To attain these objects, there is provided a system which basically depends on a low temperature regenerator system for the elimination of impurities. In other words, in this invention, no further purification techniques are required, such as rectification, absorption, adsorption, solvent extraction, etc. The absence of such further techniques markedly reduces the separation costs, but at the same time there are generated problems with respect to the production of refrigeration energy, heat transfer, and regenerator cleaning. The prior art has had generally similar problems, but the solutions thereof are inapplicable to the present invention.

Thus, for example, it is known that in systems for the separation of gaseous mixtures which operate with regenerators, the required refrigerating energy is poduced by engine expansion of a portion of a separation product which is then heated and conducted to the outside through one or more of the regenerators. (Engine expansion, sometimes called work expansion, refers to a gas being passed through a turbine or the like, thereby doing external work and approaching isentropic conditions.)

In a known process for the separation of air, a portion of the $N_2$ fraction obtained in the rectification column is, for this purpose, indirectly heated counter-currently with a side stream removed from the regenerators at a central portion thereof, and is then engine-expanded.

In other known methods, the separation product is heated up in special coils in the regenerators before the engine expansion.

If, for enriching the hydrogen, a gaseous mixture is to be separated by removing impurities in a regenerator without a further purification step, and the refrigeration energy is to be produced by expanding raw hydrogen, there is the problem of how to heat the hydrogen before the expansion, for in this case there is no nitrogen stream which is conventionally used as a scrubbing liquid for the production of high purity hydrogen.

This invention, in dealing with such a problem, provides a novel process and apparatus generally applicable to the enrichment of compressed raw gases containing condensable impurities, the process, in its broad aspects, comprising the steps of:

(a) Cooling said compressed raw gas in one of at least three interconnected switchable heat exchange zones to condense impurities within said zone and to enrich said compressed raw gas;

(b) Branching compressed enriched gas into first and second streams;

(c) Heating at least said first stream in one of said at least three interconnected switchable heat exchange zones;

(d) Mixing resultant heated first stream with said second stream;

(e) Engine-expanding resultant mixture of first and second streams to cool said mixture; and (f) Heating resultant cooled mixtures in one of said at least three interconnected switchable heat exchange zones to form heated enriched gas.

In accordance with a preferred embodiment of this invention as applied to hydrogen enrichment, the previously mentioned problem is solved by branching enriched hydrogen leaving a regenerator (impurity-separating generator) into three streams. The first is heated in a heating coil arranged within said regenerator. The heated first stream is then combined with the second stream; the resultant mixture is engine-expanded and subsequently heated by passage through another regenerator (heat-up regenerator) which was previously freed from condensates. The third stream in the meanwhile is conducted as an auxiliary scavenger gas through the third regenerator (evaporation regenerator) to evaporate and entrain condensed impurities.

The stream designated as the "second stream" represents the main quantity, about 70 to 90% by volume, of the enriched gas, while the "third stream" constitutes only a few percent, about 2 to 3% by volume of the enriched gas.

Figure 2:
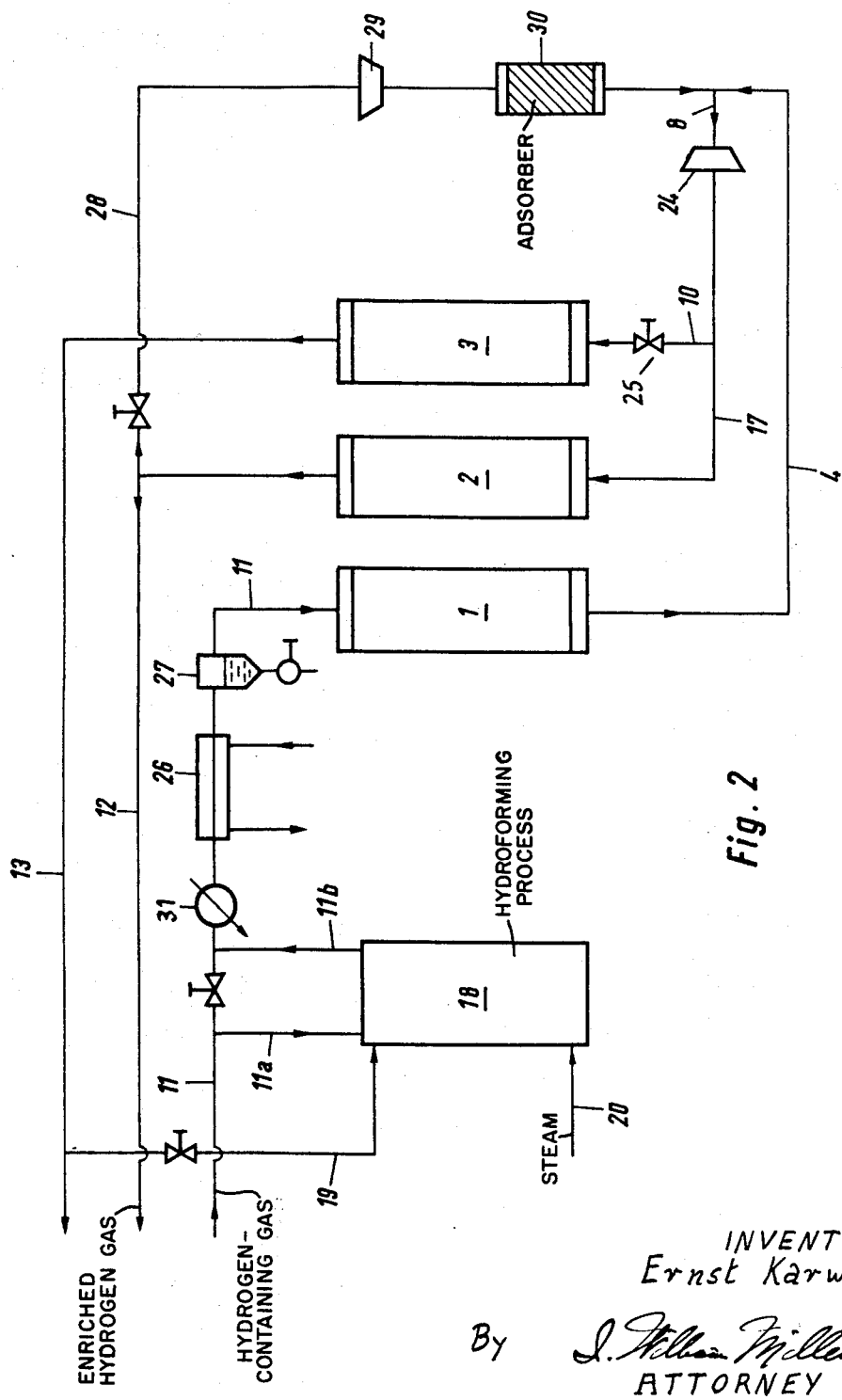

With respect to the attached drawings, FIGURES 1 and 2 are diagrammatic flowsheets of preferred embodiments of this invention, FIGURE 2 in particular illustrating a combination of hydrogen production and hydrogen enrichment.

The advantages of the process of this invention reside particularly in the simplicity of its mode of operation, even in its fully automated version, and also in the low investment cost for the associated apparatus. In addition to three cyclically exchangeable regenerators, each provided with a heating coil in its interior, the preferred system comprises essentially only a compressor, two expansion turbines, and a blower capable of creating a low pressure in the evaporating regenerator.

These refrigerating losses in the system are compensated for by engine-expanding the enriched hydrogen. So that the expansion of the enriched hydrogen proceeds without the formation of condensate which would be harmful to a turbine, for example, the enriched hydrogen should not be conducted to the expansion turbine at the low temperature which it exhibits after it leaves the separation regenerator. Consequently, the "first stream" is branched off therefrom, heated up in a coil built into the separation regenerator, and then again combined with the "second stream" (the main quantity of the enriched hydrogen flowing to the turbine).

Alternatively, the first stream can also be branched off from the enriched hydrogen after the enriched hydrogen is heated in the regenerator and re-compressed; it is then added in a heated condition to the second stream at a location upstream of the expansion turbine in a mixing proportion of 3–5 parts of warm gas and 95–97 parts of cold gas.

The quantity of the first stream is, in both cases, preferably selected so that the temperature of the enriched hydrogen, after recombining of the first with the second stream, is sufficiently high to prevent condensate formation in the cold gas in the ensuing engine expansion step. The temperature of the hydrogen after expansion depends upon—besides the temperature before expansion—the pressure ratio of the hydrogen before and after its expansion, and is regulated so that it is a few centigrade degrees lower, e.g. about 2 to 4, than the temperature at which the enriched hydrogen leaves the separation regenerator. The expanded hydrogen is subsequently passed through the heating-up regenerator which was previously freed from condensates. If the temperature at the cold end of the regenerators is predetermined in this manner, the pressure of the gas to be enriched in the separation regenerator, in turn determines the purity of the enriched hydrogen.

The condensed impurities separated from the raw gas evaporate vigorously as soon as the total pressure of the gas phase in the evaporation regenerator decreases below the vapor pressure of the impurities. Below atmospheric pressure, the vapors are removed by suction by means of a blower. The evaporation of the condensates is completed, in accordance with this invention, by branching off from the cold enriched hydrogen a "third stream" and introducing it as an auxiliary scavenger gas into the evaporation regenerator via the cold end.

If there is no auxiliary gas stream or an insufficient quantity thereof, substantial quantities of unevaporated condensates will remain in the regenerator. They will then sublime, in the next switching period in the same regenerator, this time functioning as a heating-up regenerator, so that enriched expanded hydrogen passing therethrough will entrain the remainder of the impurities. The hydrogen content of the enriched hydrogen will then obviously decrease substantially during this process. This can be compensated for, partially, according to the invention, by producing the enriched hydrogen leaving the separating regenerator with a higher initial hydrogen content than that of the final hydrogen concentration. This is accomplished by maintaining a correspondingly lower temperature at the cold end of the separation regenerator.

The latter mode of operation can be utilized as long as the gaseous components returning with the final hydrogen product are not deleterious, such as for example $CH_4$ in a hydrocracking process. Under such favorable conditions, the auxiliary scavenging gas (the "third stream") can actually be completely omitted. However, the situation is different if impurities such as $H_2S$ are condensed in the regenerator from the raw gas. To avoid these harmful impurities and to prevent them from entering the hydrogen product, the auxiliary gas stream must be sufficiently large in order to completely evaporate the hydrogen sulfide before the expanded hydrogen product is passed through the heat-up regenerator.

The process steps conducted in accordance with the foregoing in regenerators 1–2–3 are conducted in the following switching period in the regenerators 2–3–1, and in the switching period following thereafter in the regenerators 3–1–2, so that in each of the regenerators the entire process takes place in chronological sequence.

In between the switching periods, certain measures are preferred for performing the changeover of the regenerators. The hydrogen still present in the separation regenerator 1 is conducted, insofar as feasible, into the two other regenerators via the cold ends thereof, or into the final product pipeline, so that only as small a fraction of the hydrogen as possible enters the residual gas together with the re-evaporated condensates.

The present process differs from known processes in that in the former a separation product exiting from a regenerator forms two partial streams before the engine-expansion, these streams being then recombined before the expansion step but after one or more of the streams has been heated. The present process further differs from hydrogen enrichment processes by the fact that raw hydrogen is preferably used as the auxiliary scavenger gas for sublimation. Still further, the preferred embodiment of the present process is distinguished from all aforementioned processes in that three partial streams are formed from a regeneratively obtained separation product.

This invention is particularly applicable to the treatment of refinery exhaust gases containing hydrogen in the range of 30 to 80%, the remainder being hydrocarbons, carbon monoxide, and nitrogen.

In the process of upgrading hydrogen-containing gases, by which process highly concentrated hydrogen is gained, it is of special importance that the gases subjected to this process may contain substances which solidify during the low temperature treatment and that it is possible to dispense with preliminary purifying steps for the removal of such substances like carbon dioxide, hydrogen sulphide, and aromatic hydrocarbons.

As another aspect of this invention, there is provided a process for the enrichment of raw hydrogen (e.g. low concentration hydrogen stream leaving a hydrocracking, i.e., hydroforming, operation) in unique cooperation with the production of fresh hydrogen to continuously yield not only hydrogen of an enriched concentration, but also sufficient hydrogen to meet the demands of a hydrogen-consuming step, such as a hydrocracking operation. (For the purposes of clarification, in this embodiment raw hydrogen refers to a hydrogen-containing process stream having its hydrogen concentration previously lowered in a reaction whereas fresh hydrogen refers to newly produced hydrogen.)

This is done by mixing a fresh gaseous mixture of $H_2$, $CO_2$, CO and $CH_4$ produced, for example, by any conventional manner with a raw hydrogen-containing gas, and then enriching the mixture by separating both gases together in the regenerators into a hydrogen product of a desired purity of 95% and a residual gas containing $CO_2$, CO, and $CH_4$ and, in the case of certain raw gases, such as hydrocracking effluent gases, other components such as higher hydrocarbons.

In order to produce fresh hydrogen, all known methods can be utilized, but the preferred method is based on using hydrocarbons as raw materials. In the present case, it is particularly advantageous to subject at least a portion of the raw hydrogen-containing gas leaving the hydroforming operation to partial oxidation-conversion of the hydrocarbon contained therein, with the aid of steam, and thus to produce the required hydrogen as a mixture with $CO_2$, CO and $CH_4$.

Industrially, hydrogen is produced from hydrocarbons in two stages: In the first stage, the reactions $CH_4+H_2O=CO+3H_2$ and $CO+H_2O=H_2O+CO_2$ are conducted at suitable temperatures, e.g., 700–900° C., resulting in a gaseous mixture consisting essentially of $H_2$, CO, $CO_2$ and $CH_4$. Subsequently, in the second stage, most of the remaining CO is converted at a lower temperature, e.g. 400° C., with a different catalyst into $CO_2$, according to the Equation $CO+H_2O=CO_2+H_2$ (shift-reaction).

A typical gaseous mixture resulting from the first stage has, for example, the composition: 70 to 75% $H_2$, 10 to 15% CO, 9 to 12% $CO_2$, the remainer being $CH_4$. Here, the quantity of $CO_2$, which must be removed for practical purposes, thus amounts to about $\frac{1}{7}$ of the quantity of the produced $H_2$. In the second stage, additional $H_2$ and equivalent amounts of $CO_2$ are produced. Thus, in the shift-reaction per m.³ of $H_2$ produced one m.³ of $CO_2$ has to be removed. With special consideration of the removal of $CO_2$ it is, therefore, advantageous to make use only of the first stage of producing hydrogen by steam-reforming without a subsequent shift-reaction.

By a comprehensive embodiment of this invention, it is indeed possible and highly advantageous to produce the fresh hydrogen using only the first stage, and to separate the CO and $CO_2$ produced in this stage in the regenerators. The CO eventually exits into the residual gas where its heating value can be beneficially consumed.

On the other hand, if desired under certain economic or technical conditions, such as the composition of gases, it is also possible to convert the CO by the second stage in order to produce additional hydrogen. In that case, the additional quantity of $CO_2$ stemming from the conversion must, of course, be condensed in the regenerators and must subsequently be revaporized by entrainment in gases which are separated in lower temperature zones of the regenerators, such as $CH_4$, CO and $N_2$. The decision with regard to the question whether the production of the hydrogen is to be conducted with or without shifting will thus also depend upon the composition of gas to be fed to the regenerators, because there must also always be sufficient quantities of low boiling gases ($CH_4$, CO, $N_2$) which support the re-evaporation of the condensed $CO_2$.

The process of this invention will now be explained in more detail with reference to the preferred embodiments shown in the drawing. These preferred embodiments are, however, not to be construed as limitative in any way whatsoever of broader aspects of this invention as taught in the remainder of the specification and as set forth in the claims.

Referring now to FIGURE 1, reference numerals 1, 2 and 3 designate three cyclically exchangeable regenerators or reversing exchangers of which each carries out in chronological sequence those operating steps which take place simultaneously in the three regenerators during one switching period.

The gaseous mixture is expanded in the expansion turbine 21 from a pressure of, for example, 30 atmospheres absolute to 10 atmospheres absolute. This raw mixture, containing about 60% hydrogen, the remainder being 40% hydrocarbons of 1–5 carbon atoms, $CO_2$, $CH_4$, $H_2S$, organic sulfur compounds, carbon monoxide, and nitrogen, is conducted via line 11 to separation regenerator 1, and is separated into condensate (congealed impurities) and enriched hydrogen having a content of 95.5% hydrogen.

The enriched hydrogen leaves the regenerator 1 through line 4. A portion of the enriched hydrogen (10 to 30%) is branched off via line 5 (first stream) and is heated in the coil 6. At 7, this heated partial stream which is regulated by the throttle valve 9 in the pipeline 8 is combined with the main quantity (second stream) of the enriched hydrogen. The resultant mixture is then expanded in the expansion turbine 24 to a pressure of 5 atm. abs. and conducted via line 17 into the regenerator 2 where it is heated and absorbs traces of non-evaporated condensates. The purity of the enriched hydrogen here decreases to about 95.2%. Via line 12, enriched hydrogen having a hydrogen content of 95.2% is conducted, under a pressure of 5 atm. abs. into the compressor 22 and there compressed to 30 atm. abs.

In the regenerator 3, in the meantime, the condensates separated from the raw gas in the preceding switching period are evaporated and removed by suction from line 13 by means of blower 23 at a sub-atmospheric pressure of, for example, 0.5 atm. abs. Simultaneously, small portion (2 to 3%) of the hydrogen (third stream) flows, at this low pressure, through the line 10 across the regenerative mass of the regenerator 3 and completes the sublimation of the condensates evaporating at low partial pressure. The total of the evaporating condensates is a mixture consisting of hydrocarbons and hydrogen, in addition to small quantities of $CO_2$ and $H_2S$.

In another embodiment of the invention, the temperature of the exhaust of the expansion turbine 24 or the temperature at the cold end of the regenerators is selected to be so low that the gas residue consisting of $CH_4$ assumes partial pressure of 0.2 atm. abs. at the cold end of the regenerator. The enriched hydrogen contains, thus, at a total pressure, of 10 atm. abs., 98% hydrogen and 2% $CH_4$. During the evaporation of the impurities, the vacuum blower or pump 23 maintains the pressure in regenerator 3 at 0.2 atm. abs., while line 10 remains closed by an auxiliary valve 25. With this mode of operation, any substance the vapor pressure of which does not exceed 0.2 atm. abs. remains in the regenerator 3 at the end of the evaporation period. Then, in the next switching period, hydrogen of a purity of 98% passes over these remaining condensates at a pressure of 5 atm. abs. (i.e., with a $CH_4$ partial pressure of 0.1 atm. abs.), evaporates same, and leaves with a content of 4% $CH_4$— and, for example, still 2% $C_2$ hydrocarbons and 1% $C_3$ hydrocarbons. Thus, in total, this manner of operating the process yields a product of hydrogen having a content of 93% hydrogen and 7% hydrocarbons. The advantage herein, however, is that no hydrogen is needed for flushing.

This latter type of operation can, however, only be applied to $H_2S$—free raw gases. Without auxiliary scavenger gas, the hydrogen sulfide which has, for example, a vapor pressure of 0.2 atm. abs., in the regenerator, would not be evaporated by means of the vacuum blower alone, but would only evaporate into the expanded enriched hydrogen when heating the latter. This would be unacceptable for many purposes. In such cases, an auxiliary scavenger gas must also be employed, in addition to the vacuum blower.

A further modified embodiment of the process of this invention provides the branching off of a portion of the produced hydrogen exiting from the compressor 22 at a pressure of 30 atm. abs. at point 14, and to admix this portion to the second partial stream via the expansion valve 16 at point 15. In this case, the temperature of pre-expanded mixture can be sufficiently warm without heating the first stream in the coil 6. Therefore, coil 6 can be omitted.

So not to obscure the invention, the valves in the six lines emerging from each regenerator (which valves are both necessary and conventional for conducting a continuous process) are not illustrated in the drawing. The bold lines represent pipelines which are open during the switching phase illustrated, while the dashed lines represent closed pipelines.

The simultaneous production and enrichment of hydrogen will be explained now in greater detail with reference to the embodiment shown schematically in FIGURE 2. The parts of the regenerator system which are identical with those shown in FIGURE 1 are provided with the same reference numerals in FIGURE 2.

This example is based on a refinery which has an hourly requirement of 16,000 Nm.³ hydrogen of a purity of 95% and which yields hourly 15,000 Nm.³ of a raw hydrogen-containing gas of 53% $H_2$, 30–38% $CH_4$, 7–15% $C_2H_6$, 4–6% $C_3H_8$, and 1–2% $C_4H_{10}$ at a pressure of 30–32 atm. abs.

Thus, 15,000 Nm.³/h. raw hydrogen-containing gas are fed to the system at a pressure of 30–32 atm. abs. via line 11. A portion thereof (4200 Nm.³/h.) enters a partial-oxidation furnace 18 via line 11a, this furnace being heated with residual gas branched off via line 19, and also being supplied with steam via line 20. In this furnace, the 4200 Nm.³/h. of hydrogen-containing gas are converted at 825° C., with 12 tons of steam and with a supply of $18 \times 10^6$ kcal. heating energy, to 13,400 Nm.³/h. gas of 78% $H_2$, 9.6% CO, 10.8% $CO_2$ and 1.6% $CH_4$. This resultant gas leaves the furnace via line 11b and is combined, in line 11, at a pressure of 30 atm. abs. with 10,800 Nm.³/h. raw hydrogen-containing gas. Then, it is conducted through heat exchanger 31 and cooled in the water cooler 26 to approximately room temperature. Water in the gas thereby condenses and is collected in separator 27. The gas now enters the regenerator 1 in a pre-dried state. In the regenerator 1, there are separated, in addition to CO, $CH_4$ and $N_2$, 1450 Nm.³/h. $CO_2$. Hydrogen of a purity of 95.5% leaves the regenerator 1 via line 4.

This raw hydrogen is conducted, via line 8, to the turbine 24 and is there engine-expanded to 11 atm. abs. The main quantity of the expanded raw hydrogen is then conducted through line 17 into the regenerator 2 where it is heated up, the heated gas also entraining remains of condensates which were not evaporated in the preceding switching period. From line 12 there are withdrawn per hour 16,000 Nm.³ hydrogen having a purity of 95% at a pressure of about 10 atm. abs.

The enriched hydrogen flowing through line 4 must be heated before it is expanded. For this purpose, a partial stream of about 3% is branched off from the hydrogen product in line 12, via line 28. This partial stream is compressed in compressor 29 to 30 atm. abs., preferably freed in adsorber 30 of any traces of $CO_2$ and $H_2O$, and combined with the cold enriched hydrogen in line 8.

In the switching period illustrated, the evaporation of the condensates takes place in the regenerator 3. This evaporation is accomplished by lowering the pressure to 1 atm. abs. and by passing about 3% of the expanded enriched hydrogen flowing through line 17 which quantity is branched off through line 10 into the regenerator 3. From line 13, there are delivered 7800 Nm.³ per hour of residual gas at 1 atm. abs. having a $CO_2$ content of 18.6% and an upper calorific value of about $71 \times 10^6$ kcal. From this amount of heat energy, about $18 \times 10^6$ kcal. are utilized for heating the partial-oxidation furnace (line 19).

In instead of producing fresh hydrogen, only the 15,000 Nm.³ per hour of raw gas were subjected to the enriching process, it would only be possible to branch off therefrom 7900 Nm.³ hydrogen of 95% purity; thus, the hydrogen demand of the integrated process could not be met.

Whereas this invention has been described with particular emphasis on the enrichment of hydrogen, it is nevertheless obvious that it has general utility in the enrichment of any gaseous mixture having congealable impurities.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for enriching hydrogen without fractional distillation in a compressed hydrogen-containing raw gas containing condensable impurities, said process comprising the steps of:
    (a) cooling said compressed hydrogen-containing raw gas in a first of three interconnected switchable regenerative heat exchangers to condense within said heat exchanger the bulk of the impurities having boiling points higher than that of hydrogen and to enrich hydrogen in the remaining gas;
    (b) branching resultant hydrogen enriched gas into a main portion and a first minor portion;
    (c) adding a second minor portion derived from cooled gas in step (a) and reheated as enriched hydrogen to said main portion:
    (d) engine-expanding resultant mixture of said main portion constituting at least 70% of said hydrogen enriched gas, and said heated second minor portion to cool said mixture;
    (e) heating resultant cooled mixture in a second of the three interconnected switchable regenerative heat exchanges substantially completely purged of impurities; and
    (f) passing said first minor portion of step (b) through the third of said three interconnected switchable heat exchangers to remove condensed impurities therein, which were previously deposited as in step (a).

2. A process as defined by claim 1 wherein the second minor portion of heated enriched hydrogen of step (c) is branched off from said heated resultant cooled mixture of step (e).

3. A process as defined by claim 1 wherein the resultant cooled mixture, upon being heated in step (e), picks up residual impurities which were not completely removed in a cleaning step of a previous cycle, whereby the heated enriched gas in step (e) has a lower purity than compressed enriched gas immediately resulting from step (a).

4. A process as defined by claim 1 wherein said second minor portion of heated enriched hydrogen is branched off from said main portion of step (b).

5. A process as defined by claim 4 wherein said second minor portion is heated in indirect heat exchange relationship with the compressed hydrogen-containing raw gas being cooled.

6. A process as defined by claim 1 wherein said compressed raw gas is comprised of a mixture of (1) hydrogen-containing raw gas obtained as effluent from a hydroforming process, and (2) freshly produced gas containing hydrogen and minor amounts of $CO_2$, CO, and $CH_4$.

7. A process as defined by claim 6 comprising further step of heating a portion of said hydrogen-containing raw gas and reacting said portion with steam to produce said freshly produced gas containing a major amount of hydrogen and minor amounts of $CO_2$, CO, and $CH_4$.

8. A process as defined by claim 7 wherein said freshly produced gas contains at least 10% CO.

9. A process as defined by claim 8 comprising a further step of employing resultant said first minor portion from step (f) for said heating of a portion of hydrogen-containing raw gas in step 15.

References Cited

UNITED STATES PATENTS

| | | | |
|---|---|---|---|
| 2,071,763 | 2/1937 | Pollitzer | 62—12 |
| 2,119,565 | 6/1938 | Williams | 23—212 |
| 2,460,859 | 2/1949 | Trumpler | 62—14 |
| 2,827,775 | 3/1958 | Linde | 62—38 XR |
| 3,071,453 | 1/1963 | James | 62—213 XR |
| 3,073,128 | 1/1963 | Becker | 62—39 XR |
| 3,143,406 | 8/1964 | Becker | 62—13 |
| 3,182,461 | 5/1965 | Johanson | 62—38 XR |
| 3,214,925 | 11/1965 | Becker | 62—38 XR |
| 3,264,831 | 8/1966 | Jakob | 62—38 XR |
| 3,271,110 | 9/1966 | Bratzler | 23—212 XR |

NORMAN YUDKOFF, *Primary Examiner.*

V. W. PRETKA, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,400,546            September 10, 1968

Ernst Karwat

It is certified that error appears in the above identified patent and that said Letters Patent are hereby corrected as shown below:

In the heading to the printed specification, lines 4 and 5 "Gesellschaft fur Linde's Eismaschinen Aktiengesellschaft, Wiesbaden, Germany" should read -- Linde Aktiengesellschaft, Wiesbaden, Germany --. Column 2, line 17, "poduced" should rea -- produced --; line 58, "mixtures" should read -- mixture --. Column 5, line 21, "$H_2O$", third occurrence, should read -- $H_2$ - Column 6, line 30, before "small" insert -- a --. Column 7, li 75, "In" should read -- If --. Column 9, line 3, cancel "in step 15".

Signed and sealed this 17th day of March 1970.

(SEAL)

Attest:

Edward M. Fletcher, Jr.            WILLIAM E. SCHUYLER, JR.

Attesting Officer            Commissioner of Patents